US010660033B2

(12) United States Patent
Li et al.

(10) Patent No.: US 10,660,033 B2
(45) Date of Patent: May 19, 2020

(54) REGULARLY SCHEDULED SESSIONS IN A CELLULAR INTERNET OF THINGS SYSTEM

(71) Applicant: QUALCOMM Incorporated, San Diego, CA (US)

(72) Inventors: Junyi Li, Chester, NJ (US); Frank Anton Lane, Easton, PA (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 14/511,172

(22) Filed: Oct. 9, 2014

(65) Prior Publication Data
US 2016/0105848 A1    Apr. 14, 2016

(51) Int. Cl.
*H04W 4/00* (2018.01)
*H04W 52/02* (2009.01)
(Continued)

(52) U.S. Cl.
CPC ........... *H04W 52/0209* (2013.01); *H04L 1/08* (2013.01); *H04W 52/0216* (2013.01);
(Continued)

(58) Field of Classification Search
CPC combination set(s) only.
See application file for complete search history.

(56) References Cited

U.S. PATENT DOCUMENTS

2009/0180414 A1*  7/2009  Maeda ................. H04B 7/2643
                                                          370/311
2010/0195552 A1*  8/2010  Ho .................... H04W 52/0216
                                                          370/311
(Continued)

FOREIGN PATENT DOCUMENTS

EP           2800444 A1    11/2014
JP       2014510495 A      4/2014
(Continued)

OTHER PUBLICATIONS

ISA/EPO, International Search Report and Written Opinion of the International Searching Authority, Int'l. App. No. PCT/US2015/051159, dated Feb. 1, 2016, European Patent Office, Rijswijk, NL, 10 pgs.

*Primary Examiner* — Yemane Mesfin
*Assistant Examiner* — Mon Cheri S Davenport
(74) *Attorney, Agent, or Firm* — Holland & Hart LLP

(57) ABSTRACT

Methods, systems, and devices are described for wireless communication at a UE. A user equipment (UE) may perform an initial access procedure to establish a connection with a serving cell. The UE may then arrange a regular transmission schedule with the serving cell including a discontinuous transmission (DTX) cycle and an acknowledgement schedule. The UE may enter a low power mode and refrain from any transmission during the a sleep interval of the DTX cycle. The UE may then wake up and transmit a message to the serving cell after the sleep interval without performing another access procedure. The UE may perform (Continued)

another access procedure to transmit at times not covered by the regular transmission schedule. For example, if an acknowledgement (ACK) for the message isn't received, the UE may perform another access procedure for retransmission.

28 Claims, 15 Drawing Sheets

(51) Int. Cl.
  *H04W 76/10* (2018.01)
  *H04L 1/08* (2006.01)
  *H04W 74/04* (2009.01)

(52) U.S. Cl.
  CPC ............ *H04W 74/04* (2013.01); *H04W 76/10* (2018.02); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/25* (2018.01)

(56) References Cited

U.S. PATENT DOCUMENTS

| | | | |
|---|---|---|---|
| 2011/0268004 A1* | 11/2011 | Doppler | H04W 72/02 370/311 |
| 2012/0302254 A1 | 11/2012 | Charbit et al. | |
| 2013/0148607 A1 | 6/2013 | Yu et al. | |
| 2013/0242825 A1 | 9/2013 | Farhadi et al. | |
| 2013/0294311 A1* | 11/2013 | Cai | H04L 1/18 370/311 |
| 2014/0036670 A1 | 2/2014 | Li et al. | |
| 2014/0153517 A1 | 6/2014 | Chen et al. | |
| 2014/0241234 A1 | 8/2014 | Zhu et al. | |
| 2014/0269475 A1 | 9/2014 | Ehsan et al. | |
| 2014/0348046 A1 | 11/2014 | Feng et al. | |
| 2016/0014717 A1* | 1/2016 | Wang | H04W 4/005 455/458 |

FOREIGN PATENT DOCUMENTS

| | | |
|---|---|---|
| WO | WO-2012135996 A1 | 10/2012 |
| WO | WO-2013107404 A1 | 7/2013 |
| WO | WO-2013159830 A1 | 10/2013 |

* cited by examiner

US 10,660,033 B2

REGULARLY SCHEDULED SESSIONS IN A CELLULAR INTERNET OF THINGS SYSTEM

BACKGROUND

1. Field of Disclosure

The following relates generally to wireless communication, and more specifically to regularly scheduled sessions in a cellular internet of things (IoT) system.

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

Some UEs may provide for automated communication. Automated UEs may include those implementing Machine-to-Machine (M2M) communication or Machine Type Communication (MTC). M2M or MTC may refer to data communication technologies that allow devices to communicate with one another or a base station without human intervention. M2M or MTC devices may include UEs and may be used as part of an Internet of Things (IoT). Some M2M or MTC devices in an IoT may include parking meters, water and gas meters, and other sensors that may infrequently communicate small amounts of data.

In some cases, including in an IoT, a UE may be a power limited device, and a significant amount of power may be used for powering radio components. However, some MTC devices may transmit or receive relatively small amounts of data at regularly spaced intervals. In some cases, a UE may still keep radio components continuously powered to be ready to transmit or receive data. A UE may also perform an access procedure to communicate with a serving cell prior to each exchange. This may also consume power. The increased power consumption from continuously powering a radio of repeatedly performing access procedures may reduce the battery life of a UE and decrease the usefulness of the device.

SUMMARY

The present disclosure may relate generally to wireless communications systems, and more particularly to improved systems, methods, and/or apparatuses for regularly scheduled sessions in a cellular internet of things system. A user equipment (UE) may perform an initial access procedure to establish a connection with a serving cell. The UE may then arrange a regular transmission schedule with the serving cell including a discontinuous transmission (DTX) cycle and an acknowledgement schedule. The UE may enter a low power mode and refrain from any transmission during a sleep interval of the DTX cycle. The UE may then wake up and transmit a message to the serving cell after the sleep interval without performing another access procedure. The UE may perform another access procedure to transmit at times not covered by the regular transmission schedule. For example, if an acknowledgement (ACK) for the message isn't received, the UE may perform another access procedure for retransmission.

A method of wireless communication at a UE is described. The method may include establishing a connection with a cell based on an initial access procedure, arranging, utilizing the connection, a regular transmission schedule comprising a discontinuous transmission cycle and an acknowledgement schedule, refraining from communicating with the cell during a sleep interval of the discontinuous transmission cycle, and transmitting data to the cell after the sleep interval according to the regular transmission schedule and based at least in part on the initial access procedure.

An apparatus for wireless communication at a UE is described. The apparatus may include means for establishing a connection with a cell based on an initial access procedure, means for arranging, utilizing the connection, a regular transmission schedule comprising a discontinuous transmission cycle and an acknowledgement schedule, means for refraining from communicating with the cell during a sleep interval of the discontinuous transmission cycle, and means for transmitting data to the cell after the sleep interval according to the regular transmission schedule and based at least in part on the initial access procedure.

A further apparatus for wireless communication at a UE is described. The apparatus may include a processor, memory in electronic communication with the processor, and instructions stored in the memory, wherein the instructions are executable by the processor to establish a connection with a cell based on an initial access procedure, arrange, utilizing the connection, a regular transmission schedule comprising a discontinuous transmission cycle and an acknowledgement schedule, refrain from communicating with the cell during a sleep interval of the discontinuous transmission cycle, and transmit data to the cell after the sleep interval according to the regular transmission schedule and based at least in part on the initial access procedure.

A non-transitory computer-readable medium storing code for wireless communication at a UE is described. The code may include instructions executable to establish a connection with a cell based on an initial access procedure, arrange, utilizing the connection, a regular transmission schedule comprising a discontinuous transmission cycle and an acknowledgement schedule, refrain from communicating with the cell during a sleep interval of the discontinuous transmission cycle, and transmit data to the cell after the sleep interval according to the regular transmission schedule and based at least in part on the initial access procedure.

Some examples of the method, apparatuses, and/or non-transitory computer-readable medium described above may further include receiving an acknowledgement for the transmitted data based on the acknowledgment schedule, and entering a low power mode during a subsequent sleep interval based on the regular transmission schedule and the acknowledgement. Additionally or alternatively, some examples may include entering a high power mode prior to exchanging data with the cell based on the regular transmission schedule.

Some examples of the method, apparatuses, and/or non-transitory computer-readable medium described above may further include determining that an acknowledgement has not been received for the transmitted data based on the acknowledgement schedule, establishing a second connection based on a second access procedure in response to the determination that the acknowledgment has not been received, and retransmitting the data using the second connection. Additionally or alternatively, in some examples refraining from communicating with the cell comprises bypassing a RACH procedure.

In some examples of the method, apparatuses, and/or non-transitory computer-readable medium described above, refraining from communicating with the cell comprises refraining from decoding control channel information from the cell. Additionally or alternatively, in some examples the regular transmission schedule comprises a semi-persistent assignment of control channel segments.

Some examples of the method, apparatuses, and/or non-transitory computer-readable medium described above may further include monitoring a control channel for a resource grant from the cell based on the semi-persistent assignment. Additionally or alternatively, in some examples the semi-persistent assignment of channel segments is based on an identification (ID) of the UE and a frame index.

In some examples of the method, apparatuses, and/or non-transitory computer-readable medium described above, the regular transmission schedule is associated with the UE based on an ID of the UE and a frame index. Additionally or alternatively, in some examples the ID is assigned to the UE for a limited time and reusable by another UE after the limited time has expired.

In some examples of the method, apparatuses, and/or non-transitory computer-readable medium described above, the sleep interval is longer than an inactivity timer of the cell. Additionally or alternatively, some examples may include exchanging data with a network based on machine type communication (MTC) procedures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
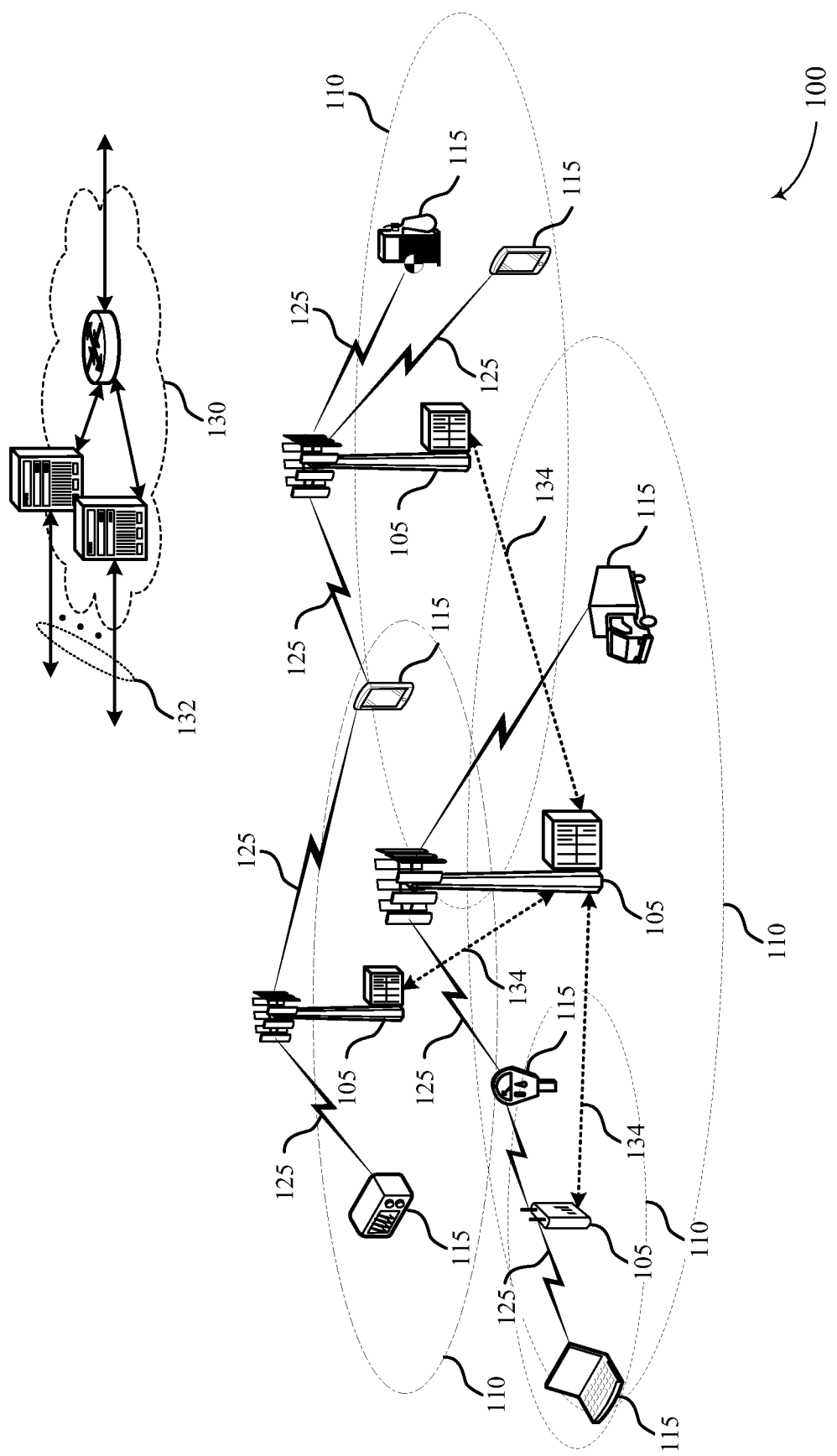
FIG. 1 illustrates an example of a wireless communications system for regularly scheduled sessions in a cellular IoT system in accordance with various aspects of the present disclosure.

A network of automated devices which communicate wirelessly may, in some cases, be referred to as the internet of things (IoT). Devices which communicate over the IoT network (e.g., machine type communication (MTC) devices) may include automated meters, sensors, and the like. In some instances, the automated devices may have relatively low throughput applications (e.g., a water level sensor sending an update to a base station). There may be a number of wireless communication systems available for use by the automated devices, including cellular systems operating in licensed spectrum. However, cellular systems may be optimized for devices which use high through-put applications. Devices that operate according to low throughput conditions (e.g., infrequent and small data transfers) may present design considerations different from those associated with higher through-put devices. For example, an automated device may be designed to operate for long periods of time without battery replacement.

In some instances, cellular systems (e.g., LTE systems) may implement a well-defined initial access procedure. For example, a device may wake up and sync to the downlink from a base station, establish it is connected to the base station, and then wait for the next random access channel (RACH) opportunity. The device may use the next RACH opportunity to request an active identification (ID) for a session. The device may then send or receive data on a regularly scheduled interval to reduce power consumption. For example, a device may establish a connection to a base station, at which point the base station and the device may establish a regular schedule to transmit data. The device may be scheduled to send or receive a single message of data at regular intervals. The intervals may vary in length.

In some examples, a device may be semi-persistently assigned a specific physical downlink shared channel (PDSCH) or physical uplink shared channel (PUSCH) segment. In such an instance, the device may transmit or receive data in the assigned segment, and may then sleep until the next interval. In some cases a link level acknowledgment may be provided by the base station after the UE transmissions. However, in some cases there may not be a link level acknowledgment.

In some cases, a device may be assigned to one or more specific frames, during which the device may be allocated any PDSCH or PUSCH segment. In this case, the device may receive PDCCH of the frame to determine the schedule of PDSCH and PUSCH segments. In such cases, the ID used in the PDCCH assignment may not be provided in the access step and the device may not hold a continuously active ID. Instead, the ID used in PDCCH may belong to an ID pool, and may be reused by multiple regularly scheduled devices communicating with a cell in non-overlapping time intervals. For example, the ID may be augmented by the frame index to uniquely represent the device. A device with a regularly scheduled interval may monitor downlink paging more frequently than the regular traffic schedule, which may allow the base station to wake up the device in an on-demand manner. In a similar on-demand manner, the device may send a RACH in a non-scheduled time.

In some cellular systems, such as LTE, user devices may transmit and receive an indefinite number of messages. For each transmission, a UE may perform a random access procedure, which may consume power. If a user device has low and/or regular data traffic (e.g., an IoT device) the overhead of performing a random access procedure for each transmission may not be justified. Thus, it may be appropriate for an IoT device to schedule transmission and receive times such that the random access procedure may be skipped.

In other cases, communication between an IoT device and a base station may be improved by using open loop timing synchronization to determine transmit symbol time. As a result, uplink signals from different IoT devices communicating with a same base station in the IoT network may arrive within a window of time, the length of which may be up to the maximum round-trip delay between the IoT devices and the base station. To account for this, the length of a cyclic prefix used in an uplink transmission by an IoT device may be extended, while the length of a cyclic prefix used in a downlink transmission to the IoT device may remain shorter than the extended uplink cyclic prefix.

In some examples, a device may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

In some examples, a device may synchronize with a cell using a waveform known to the UE beforehand, and common to a group of cells in the local region. The device may then determine a physical broadcast channel (PBCH) time. The device may receive the PBCH and use it to determine a physical layer ID for the cell and a frequency for uplink transmissions. The PBCH may also indicate a channel configuration, which may enable the device to perform a random access procedure. The channel configuration may include a time and frequency resource configuration of a shared traffic channel. In some cases, the device may determine resources for data transmission based on an index of a control channel transmission. In some cases, there may be a predetermined delay between control channel transmissions and data channel transmissions. The device may then enter a low power state during the delay.

In another example, a base station may allocate, to a device, time or frequency resources for transmitting physical random access channel (PRACH) signals. In such instance, the resource allocation may be apportioned based on a type and class of PRACH signal. For example, a UE may be assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at the device).

In yet another example, an IoT device may use stored control information from a first communication session with the base station to determine the power and timing control information for a subsequent second communication session. Specifically, in this example, a device may establish a first communication session with the base station and receive, during the first communication session, closed loop control information from the base station to aid the device in adjusting transmit signal symbol timing or power control levels associated with an uplink transmission. In such instance, the device may store, in its memory, the transmit power and symbol timing information derived from the closed loop control information during the first communication session. Subsequently, the device may utilize the stored closed loop control information from the first communication session to determine the transmit signal power or symbol timing to establish a second communication session with the base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

In wireless communications system 100, some UEs 115 may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. The UEs 115 in wireless communications system 100 that are M2M or MTC devices may also be part of an IoT. Thus, wireless communications system 100 may also include or be part of an IoT system.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Prior to accessing wireless communications system 100, a UE may receive synchronization signals and system information from a base station 105. After the UE 115 decodes the master information block (MIB) and system information blocks (SIBs) 1 and 2, the UE 115 may transmit a random access channel (RACH) preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides a UL resource grant, a timing advance and a temporary cell radio network temporary identity (C-RNTI). The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

According to the present disclosure, a UE 115 may perform an initial access procedure to establish a connection with a base station 105. The UE 115 may then arrange a regular transmission schedule with the base station 105 including a discontinuous transmission (DTX) cycle and an acknowledgement schedule. The UE 115 may enter a low power mode and refrain from any transmission during a sleep interval of the DTX cycle. The UE 115 may then wake up and transmit a message to the base station 105 after the sleep interval without performing another access procedure. The UE 115 may perform another access procedure to transmit at times not covered by the regular transmission schedule. For example, if an acknowledgement (ACK) for the message isn't received, the UE 115 may perform another access procedure for retransmission.

Figure 2:
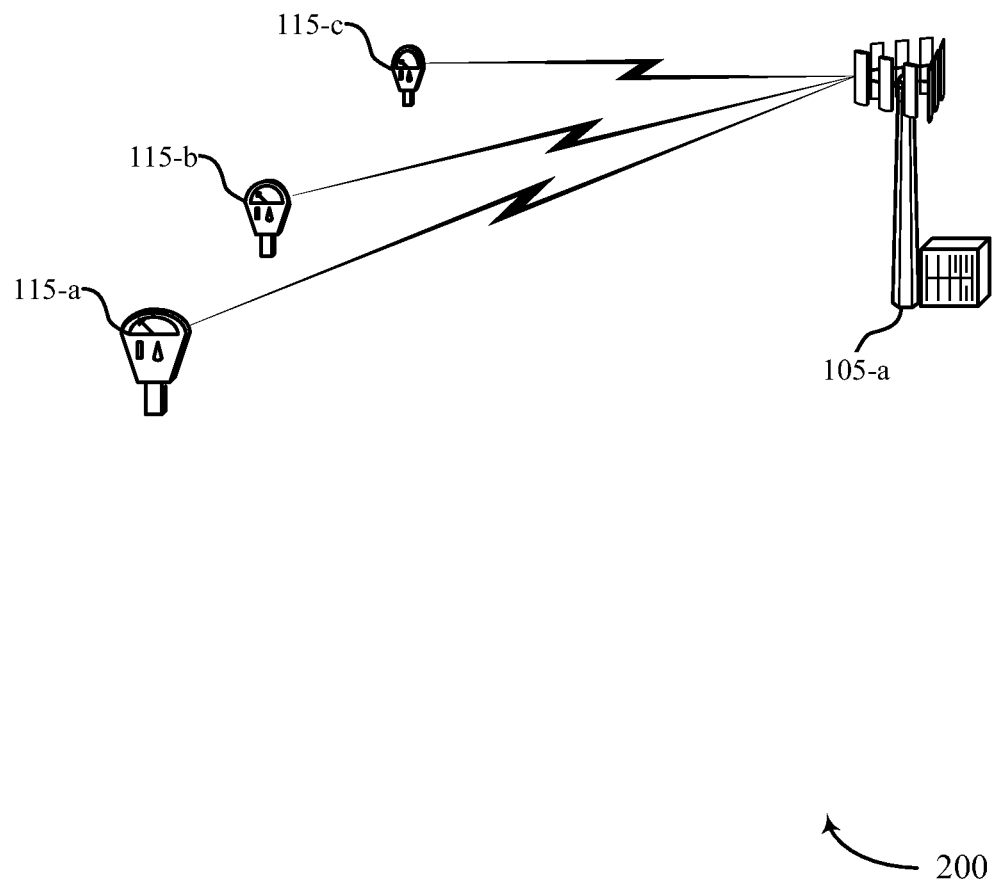
FIG. 2 illustrates an example of a wireless communications subsystem for regularly scheduled sessions in a cellular IoT system in accordance with various aspects of the present disclosure.

FIG. 2 illustrates an example of a wireless communications subsystem 200 for regularly scheduled sessions in a cellular IoT system in accordance with various aspects of the present disclosure. Wireless communications subsystem 200 may include UE 115-a, UE 115-b, and UE 115-c, which may each be examples of a UE 115 described above with reference to FIG. 1. UE 115-a, UE 115-b, and UE 115-c may also be examples of MTC devices connected as part of an IoT. Wireless communications subsystem 200 may also include a base station 105-a, which may be an example of a base station 105 described above with reference to FIG. 1.

UE 115-a, UE 115-b, and UE 115-c may communicate with base station 105-a via uplinks and downlinks, as described in relation to FIG. 1. For instance, UE 115-a may establish a connection with a base station 105-a and transmit and receive messages. For each session, UE 115-a may perform a random access procedure. Some examples (e.g. for MTC devices) may involve regular traffic patterns (e.g., a water-level sensor sending updates to a base station 105). In such instances, the overhead cost of performing a random access procedure for every session may consume significant amounts of power, which may adversely affect the performance of the device. Thus, UE 115-a may transmit and receive according to an arranged transmission schedule such that the random access procedure may be skipped for each regularly scheduled data exchange.

The transmission schedule may include a discontinuous transmission (DTX) cycle, which may indicate when UE 115-a may transmit data to base station 105-a, and an acknowledgement cycle, which may indicate when UE 115-a may receive an acknowledgement from a base station 105. For example, UE 115-a and base station 105-a may arrange a regular transmission schedule, according to which UE 115-a may send and receive data or acknowledgments. It may be appreciated that a regular transmission schedule may be different for each UE 115 in communication with a base station 105 (e.g., there may be many IoT devices on different schedules). For instance, UE 115-a may transmit and receive according to a transmission schedule which is different from a transmission schedule for UE 115-*b* or UE 115-*c*. In some cases, UE 115-*a*, UE 115-*b*, and UE 115-*c* may share a pool of IDs that may be used for the regularly scheduled non-overlapping transmissions.

Figure 3:
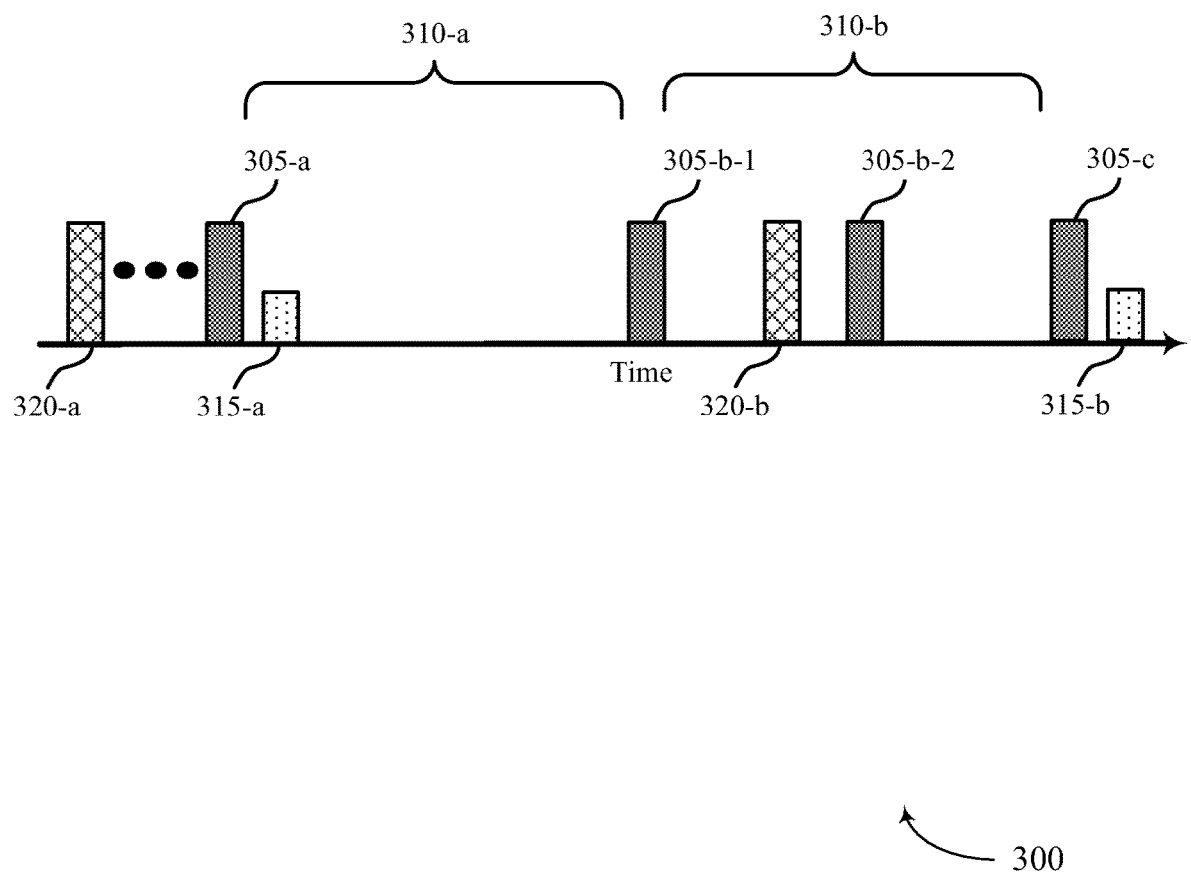
FIG. 3 illustrates an example of a transmission schedule for regularly scheduled sessions in a cellular IoT system in accordance with various aspects of the present disclosure.

FIG. 3 illustrates an example of a transmission schedule 300 for regularly scheduled sessions in a cellular IoT system in accordance with various aspects of the present disclosure. Transmission schedule 300 may be utilized by a UE 115 and a base station 105, as described above with reference to FIGS. 1 and 2. For example, transmission schedule 300 may be utilized by an MTC device as part of an IoT procedure.

Transmission schedule 300 illustrates an example of communication between a UE 115 and a base station 105 in which the UE 115 may transmit an initial access message 320-*a*. The UE 115 may establish a connection to the base station 105 and arrange a regular transmission schedule which includes a discontinuous transmission cycle and an acknowledgment schedule. Once a regular transmission schedule has been arranged, the UE 115 may transmit data according to the discontinuous transmission schedule and receive acknowledgments according to the acknowledgment schedule.

For example, a UE 115 may transmit a first data transmission 305-*a* according to the discontinuous transmission schedule and subsequently receive an acknowledgment 315-*a* from a base station 105 according to the arranged acknowledgment schedule. In some embodiments, the transmission of first data transmission 305-*a* is based at least in part on initial access message 320-*a*. That is, the UE 115 may avoid performing an additional access procedure even if the time period between the initial access message 320-*a* and the first data transmission 305-*a* is sufficiently long for the base station to drop the context of the UE 115. Instead, the base station 105 may maintain the context (or a modified regular transmission context) based on the existence of the regular transmission schedule.

After the first data transmission 305-*a*, UE 115 may refrain from transmitting to a base station 105 during first sleep interval 310-*a*. In some examples, the UE 115 may enter a low power mode during the sleep interval and subsequently enter a high power mode prior to each regularly scheduled transmission.

According to the discontinuous transmission schedule, after first sleep interval 310-*a* the UE 115 may perform a second data transmission 305-*b*-1. If the UE 115 does not receive an acknowledgment from base station 105, the UE 115 may transmit an additional random access message 320-*b* so that UE 115 may send a retransmission 305-*b*-2 of second data transmission 305-*b*-1. Retransmission 305-*b*-2 may occur outside of the regular transmission schedule (e.g. it may occur within second sleep interval 310-*b*). That is, the UE 115 may perform an additional random access procedure in order to transmit outside the regular transmission schedule.

UE 115 may then send a third data transmission 305-*c* after second sleep interval 310-*b*. Second sleep interval 310-*b* may be equal in length to first sleep interval 310-*a*, and may also be equal to an indefinite number of subsequent sleep intervals interrupted by regular transmissions. UE 115 may then receive an acknowledgment 315-*b* from base station 105 according to the arranged acknowledgment schedule.

Thus, a UE 115 may send an initial access message 320-*a* to establish a connection with a base station 105. The UE 115 may then arrange a regular transmission schedule with the base station 105 including a DTX cycle and an acknowledgement schedule. The UE 115 may enter a low power mode and refrain from any transmission during the first sleep interval 310-*a* of the DTX cycle. The UE 115 may then wake up and transmit a second data transmission 305-*b*-1 to base station 105 without performing another access procedure. If the UE 115 does not receive an ACK for the second data transmission 305-*b*-1, the UE 115 may send another access message 320-*b* to enable a retransmission during a period not covered by the regular transmission schedule.

Figure 4:
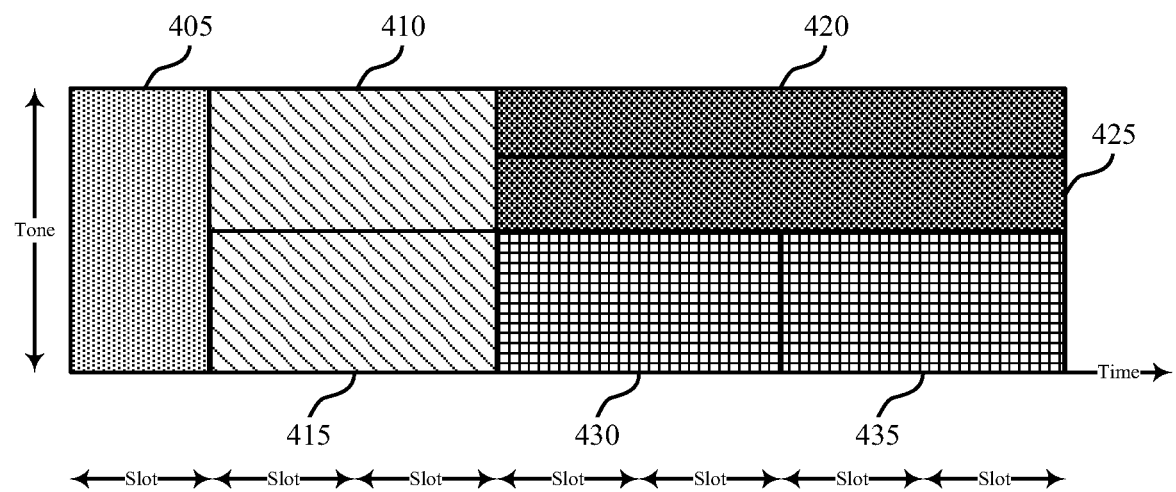
FIG. 4 illustrates an example of a resource allocation for regularly scheduled sessions in a cellular IoT system in accordance with various aspects of the present disclosure.

FIG. 4 illustrates an example of a resource allocation 400 for regularly scheduled sessions in a cellular IoT system in accordance with various aspects of the present disclosure. Resource allocation 400 depicts time-frequency resource segments which span a number of tones (i.e., frequency subcarriers). Resource allocation 400 may be provided by a base station 105 to a UE 115, and may be used in conjunction with a regular transmission schedule as described above with reference to FIGS. 2 and 3. Resource allocation 400 depicts an illustrative example including four tones, but the number of tones available may be more than four. In some cases, the number of tones for flexible allocation may be equal to the number of subcarriers in the carrier (e.g., 1200 subcarriers for a 20 MHz carrier).

A segment may comprise all the tones available for allocation, (e.g., segment 405 or a portion of the available tones (e.g., segment 420 and segment 425). In some instances, (e.g., segment 420 and segment 425) may comprise the smallest narrowband carrier in terms of bandwidth (e.g., a 15 KHz subcarrier). Other resource segments (e.g., segments 410, 415, 430, and 435) may use an intermediate bandwidth. The number of slots used by a resource segment may be inversely proportional to the number of tones in the segment. For example, segment 405, which comprises four tones available for allocation, may use only one slot while segment 410, which comprises two tones available, may use twice as many time slots. Segment 420, which comprises only one tone, may use four-times as many slots. The time-frequency resources of resource allocation 400 may be assigned to the same UE 115 or different UEs 115, and may be dynamically and flexibly allocated. For example, segments 405, 410, and 415 may be allocated to one UE 115, segments 420 and 425 may be allocated to a second UE 115 and segments 430 and 435 may be allocated to a third UE 115. In some cases, the bandwidth of the segments assigned to a UE 115 may correspond to the power limitations of the device. For example, a power limited UE 115 may be allocated a wider bandwidth to enable the device to power down radio components during a longer sleep period.

Figure 5:
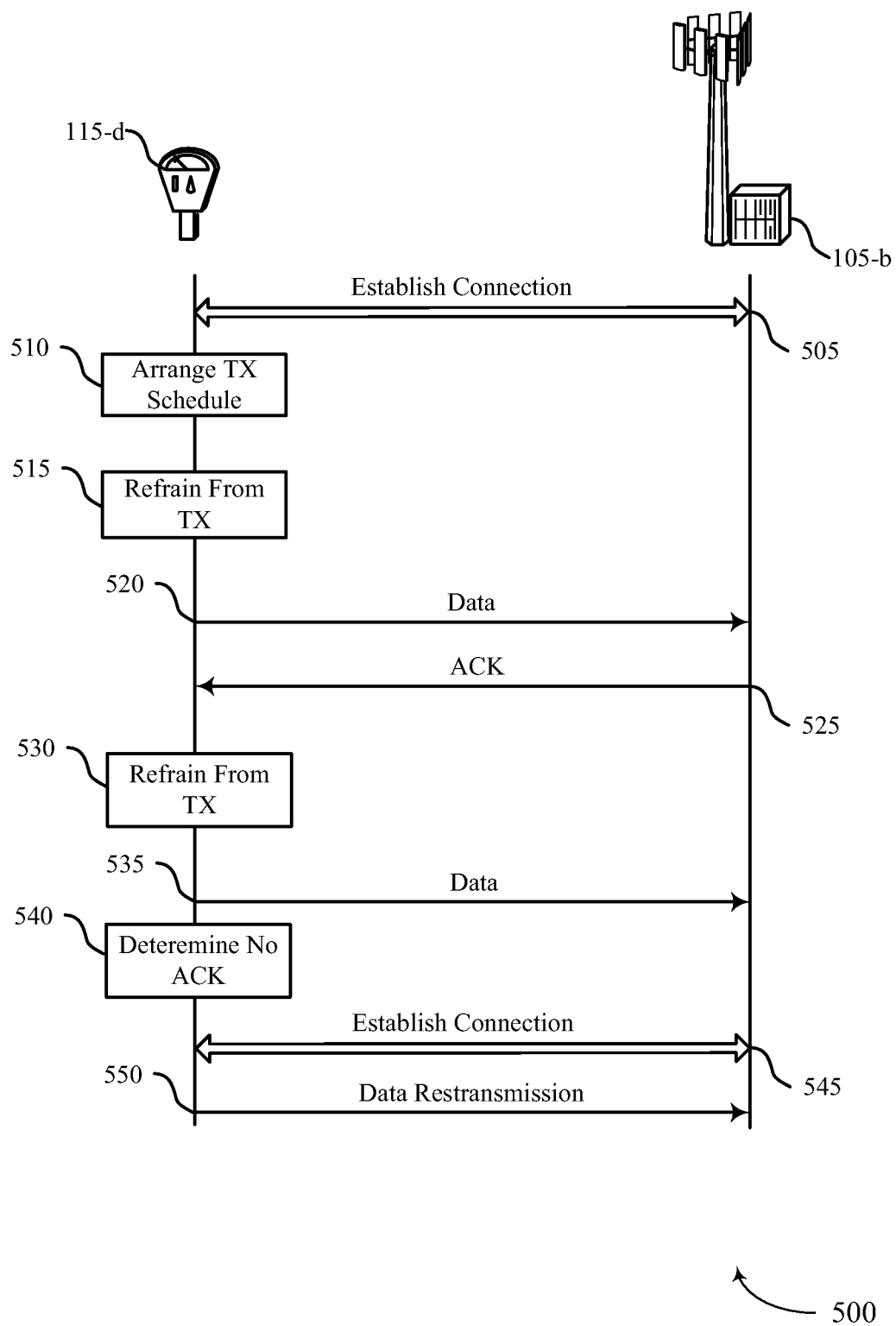
FIG. 5 illustrates an example of a process flow diagram for regularly scheduled sessions in a cellular IoT system in accordance with various aspects of the present disclosure.

FIG. 5 illustrates an example of a process flow diagram 500 for regularly scheduled sessions in a cellular IoT system in accordance with various aspects of the present disclosure. Process flow diagram 500 may include a UE 115-*d*, which may be an example of a UE 115 described above with reference to FIG. 1 or 2. Process flow diagram 500 may also include a base station 105-*b*, which may be an example of a base station 105 described above with reference to FIG. 1 or 2.

At step 505, UE 115-*d* may establish a connection with base station 105-*b* based on an initial access procedure. At step 510, using the connection, UE 115-*d* may arrange a regular transmission schedule including a discontinuous transmission cycle and an acknowledgement schedule. In some examples the regular transmission schedule may include a semi-persistent assignment of control channel segments.

During the connection, UE 115-*d* may monitor a control channel for a resource grant from base station 105-*b* (e.g., based on a semi-persistent assignment). In some examples the regular transmission schedule and the assignment of channel segments may be based on an ID of UE 115-d or a frame index (e.g., a system frame number). For instance, the ID may be assigned to UE 115-d for a limited time and may be reusable by another UE 115 after the limited time has expired.

At step 515, UE 115-d may refrain from communicating with base station 105-b during a sleep interval of the discontinuous transmission cycle. For example, UE 115-d may bypass a RACH procedure (e.g., UE 115-d may rely on base station 105-b to retain context information or expect a transmission based on the regular schedule). In some examples UE 115-d may also refrain from decoding control channel information from the cell.

At step 520, UE 115-d may transmit data to base station 105-b after the sleep interval according to the regular transmission schedule and based on the initial access procedure. In some examples the sleep interval is longer than an inactivity timer of base station 105-b, but UE 115-d may avoid another RACH procedure prior to transmitting based on the regular schedule. At step 525, UE 115-d may receive an acknowledgement for the transmitted data based on the acknowledgment schedule. In some wireless systems, after a UE 115 goes to a sleep mode, if the UE115 intends to transmit data it may first send a control signal to request uplink resource and then transmit data if the request is granted. The control signal may be a random access signal or a reserved resource dedicated to the UE 115. In accordance with the present invention, UE 115-d may already be granted data traffic resource in step 510 so that UE 115-d may avoid sending a control signal.

At step 530, UE 115-d may refrain from communicating with base station 105-b during another sleep interval. In some examples, UE 115-d may enter a low power mode during the sleep intervals based on the regular transmission schedule and based on receiving the acknowledgement. At step 535, UE 115-d may transmit data to base station 105-b after the sleep interval according to the regular transmission schedule and still based on the initial access procedure. In some examples, UE 115-d may enter a high power mode (e.g., an operational mode such that UE 115-d is capable of transmitting and receiving data) prior to exchanging data with the cell based on the regular transmission schedule.

At step 540, UE 115-d may determine that an acknowledgement has not been received for the data transmitted at step 535 according to the acknowledgement schedule. At step 545, UE 115-d may establish a second connection based on a second access procedure in response to the determination that the acknowledgment has not been received.

At step 550, UE 115-d may retransmit the data using the second connection. In some examples UE 115-d may exchange data with a network based on additional MTC procedures.

Figure 6:
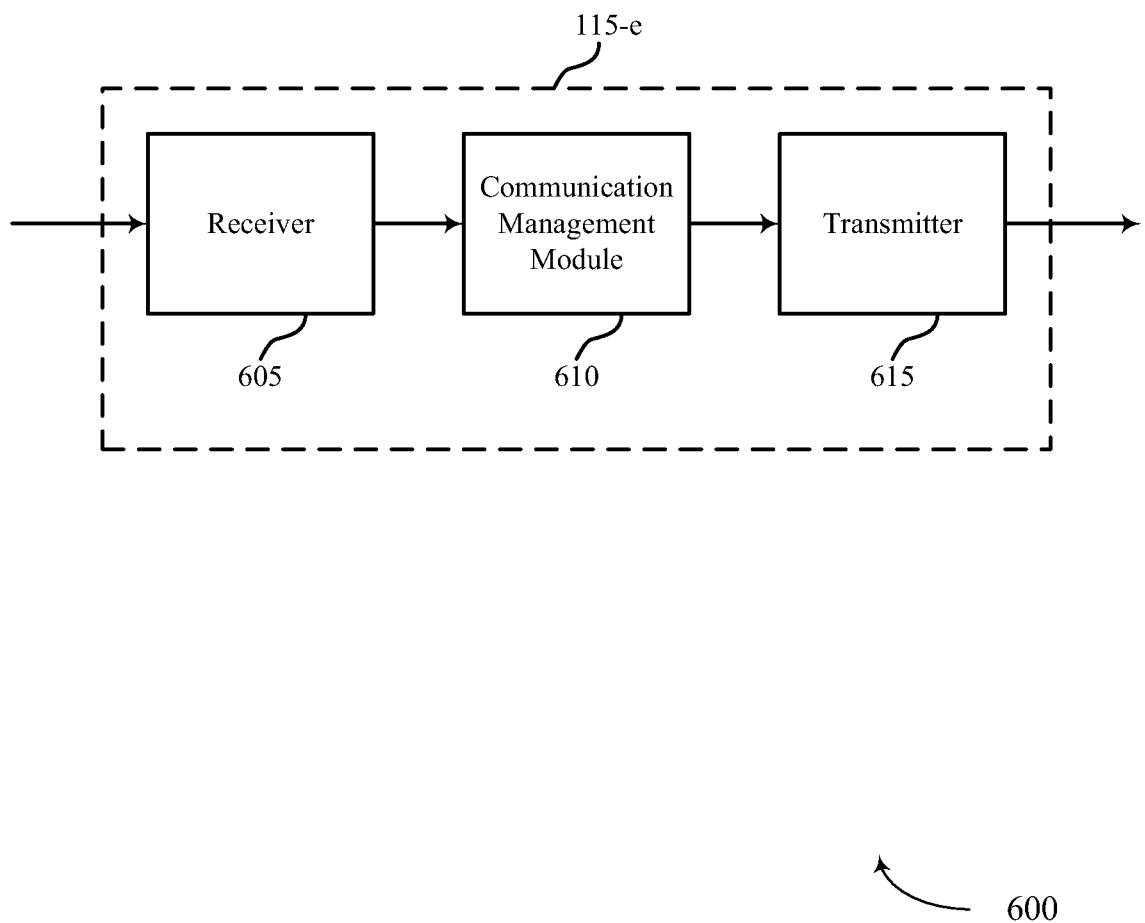
FIG. 6 shows a block diagram of a user equipment (UE) configured for regularly scheduled sessions in a cellular IoT system in accordance with various aspects of the present disclosure.

FIG. 6 shows a block diagram 600 of a UE 115-e configured for regularly scheduled sessions in a cellular IoT system in accordance with various aspects of the present disclosure. UE 115-e may be an example of aspects of a UE 115 described with reference to FIGS. 1-5. UE 115-e may include a receiver 605, a communication management module 610, and/or a transmitter 615. UE 115-e may also include a processor. Each of these components may be in communication with each other.

The receiver 605 may receive information such as packets, user data, or control information associated with various information channels (e.g., control channels, data channels, and information related to regularly scheduled sessions in a cellular IoT system, etc.). Information may be passed on to the communication management module 610, and to other components of UE 115-e.

The communication management module 610 may establish or facilitate the establishment of a connection with a cell based on an initial access procedure. The communication management module 610 may also arrange, utilizing the connection, a regular transmission schedule comprising a discontinuous transmission cycle and an acknowledgement schedule. Additionally, the communication management module 610 may refrain from communicating with the cell during a sleep interval of the discontinuous transmission cycle, and may facilitate the transmission of data to the cell after the sleep interval according to the regular transmission schedule and based at least in part on the initial access procedure.

The transmitter 615 may transmit signals received from other components of UE 115-e. In some embodiments, the transmitter 615 may be collocated with the receiver 605 in a transceiver module. The transmitter 615 may include a single antenna, or it may include a plurality of antennas. In some examples, the transmitter 615 may transmit data to the cell after the sleep interval according to the regular transmission schedule and based at least in part on the initial access procedure. In some examples, the transmitter 615 may retransmit the data using the second connection.

Figure 7:
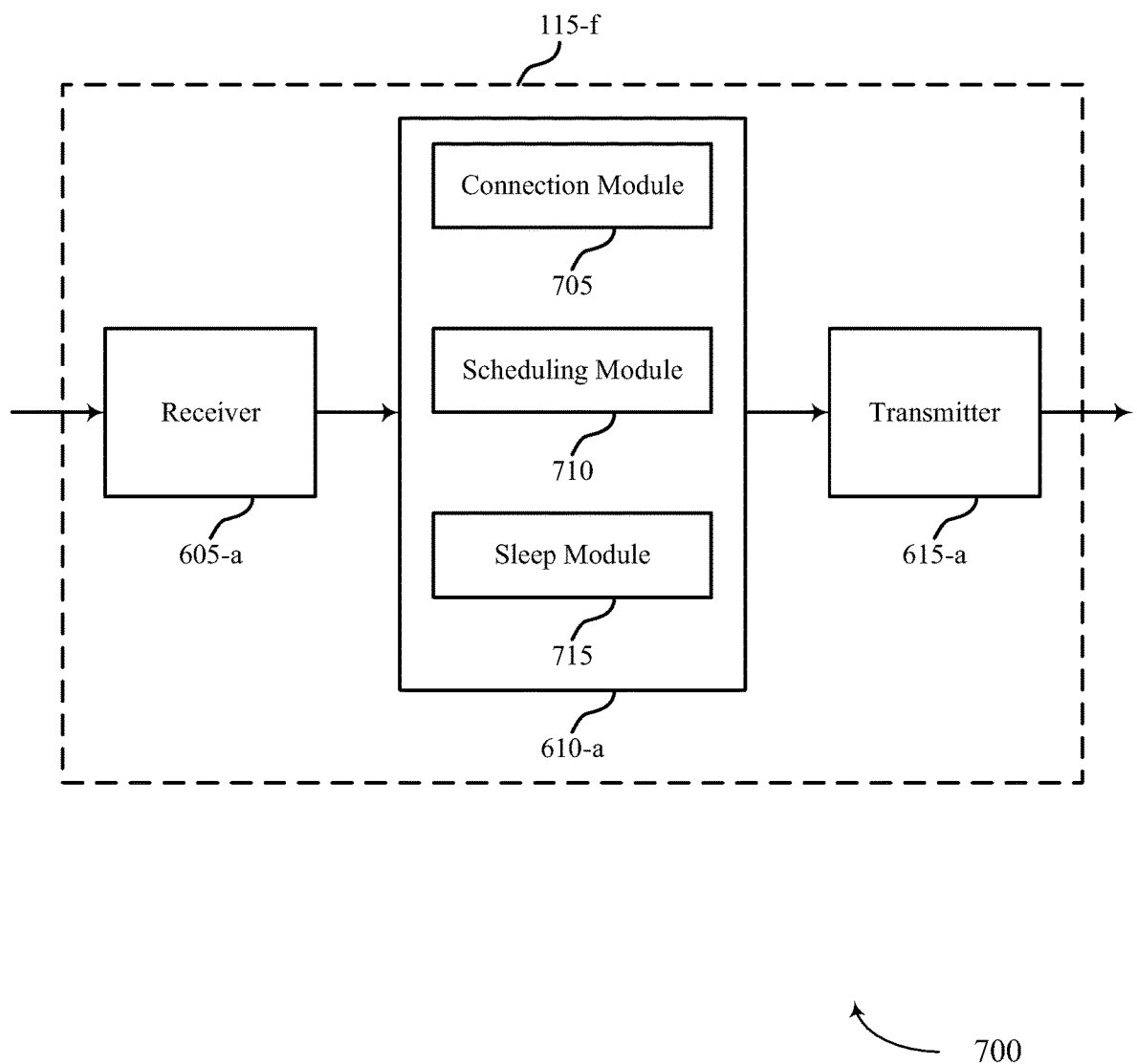
FIG. 7 shows a block diagram of a UE configured for regularly scheduled sessions in a cellular IoT system in accordance with various aspects of the present disclosure.

FIG. 7 shows a block diagram 700 of a UE 115-f for regularly scheduled sessions in a cellular IoT system in accordance with various aspects of the present disclosure. UE 115-f may be an example of aspects of a UE 115 described with reference to FIGS. 1-6. UE 115-f may include a receiver 605-a, a communication management module 610-a, and a transmitter 615-a. The receiver 605-a, the communication management module 610-a and the transmitter 615-a may be examples of the receiver 605, the communication management module 610 and the transmitter 615 described above in relation to FIG. 6. UE 115-f may also include a processor. Each of these components may be in communication with each other. The communication management module 610-a may also include a connection module 705, a scheduling module 710, and a sleep module 715.

The receiver 605-a may receive information which may be passed on to communication management module 610-a, and to other components of UE 115-f. The communication management module 610-a may perform the operations described above with reference to FIG. 6. The transmitter 615-a may transmit signals received from other components of UE 115-f.

The connection module 705 may establish a connection with a cell based on an initial access procedure as described above with reference to FIGS. 2-5. The connection module 705 may also establish a second connection based on a second access procedure in response to the determination that an acknowledgment has not been received.

The scheduling module 710 may arrange, utilizing the connection, a regular transmission schedule comprising a discontinuous transmission cycle and an acknowledgement schedule as described above with reference to FIGS. 2-5. In some examples, the regular transmission schedule may be associated with UE 115-f based on an ID of UE 115-f and a frame index. In some examples, the ID may be assigned to UE 115-f for a limited time and may be reusable by another UE 115 after the limited time has expired.

The sleep module 715 may refrain from communicating with the cell during a sleep interval of the discontinuous transmission cycle as described above with reference to FIGS. 2-5. The sleep module 715 may also enter a low power mode during a subsequent sleep interval based on the regular transmission schedule and the acknowledgement. The sleep module 715 may also enter a high power mode prior to exchanging data with the cell based on the regular transmission schedule. In some examples, refraining from communicating with the cell includes bypassing a RACH procedure. In some examples, refraining from communicating with the cell includes refraining from decoding control channel information from the cell. In certain examples, the sleep interval may be longer than an inactivity timer of the cell.

Figure 8:
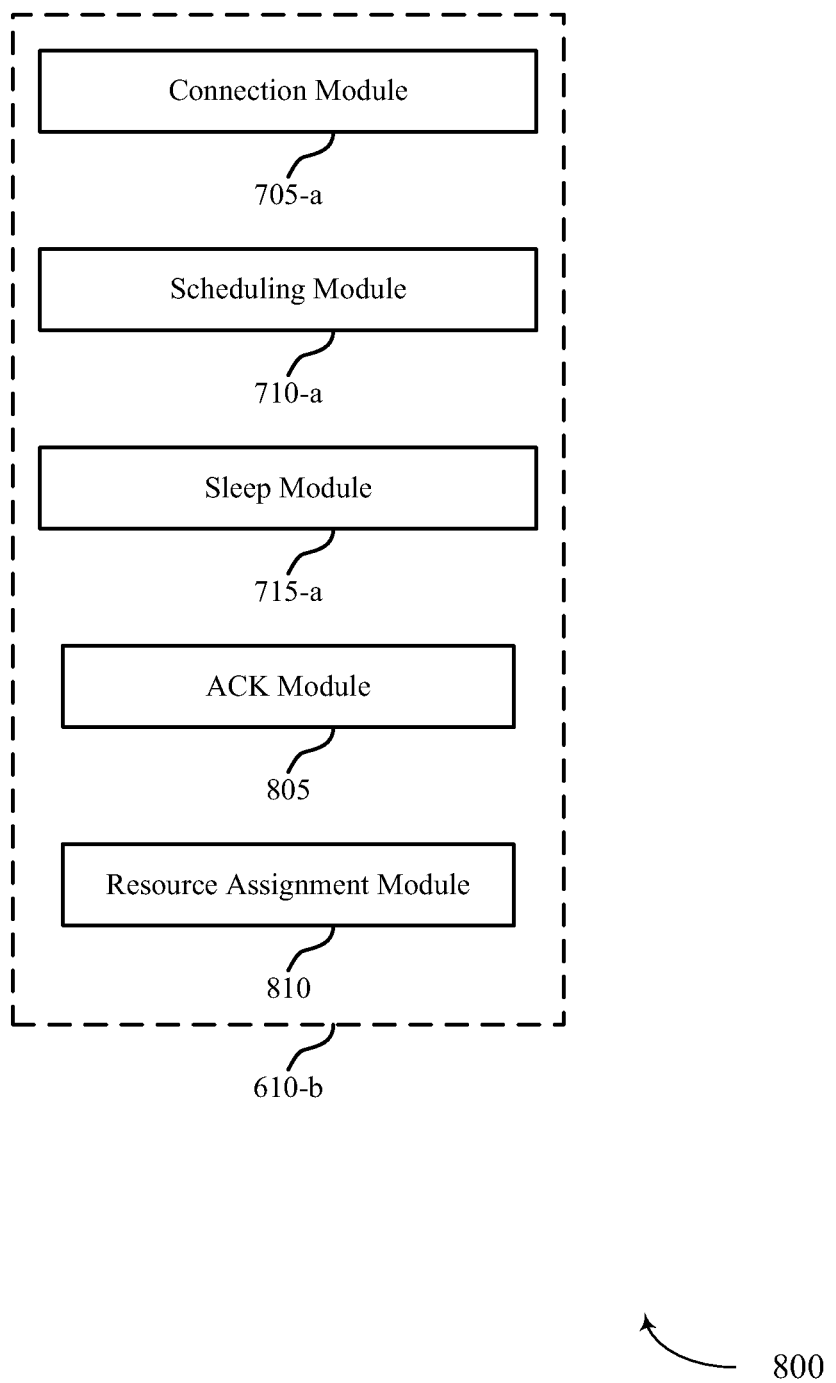
FIG. 8 shows a block diagram of a communication management module configured for regularly scheduled sessions in a cellular IoT system in accordance with various aspects of the present disclosure.

FIG. 8 shows a block diagram 800 of a communication management module 610-b for regularly scheduled sessions in a cellular IoT system in accordance with various aspects of the present disclosure. The communication management module 610-b may be an example of aspects of a communication management module 610 described with reference to FIGS. 6 and 7. The communication management module 610-b may include a connection module 705-a, a scheduling module 710-a, and a sleep module 715-a. Each of these modules may perform the functions described above with reference to FIG. 7. The communication management module 610-b may also include an ACK module 805, and a resource assignment module 810.

The ACK module 805 may receive an acknowledgement for the transmitted data based on an acknowledgment schedule as described above with reference to FIGS. 2-5. The ACK module 805 may also determine that an acknowledgement has not been received for the transmitted data based on the acknowledgement schedule so that the connection module 705-a may re-establish a connection with the cell, as described above with respect to FIG. 7.

The resource assignment module 810 may be configured such that the regular transmission schedule may include a semi-persistent assignment of control channel segments as described above with reference to FIGS. 2-5. The resource assignment module 810 may also monitor a control channel for a resource grant from a serving cell based on the semi-persistent assignment. In some examples, the semi-persistent assignment of channel segments may be based on an ID of the UE 115 and a frame index.

Figure 9:
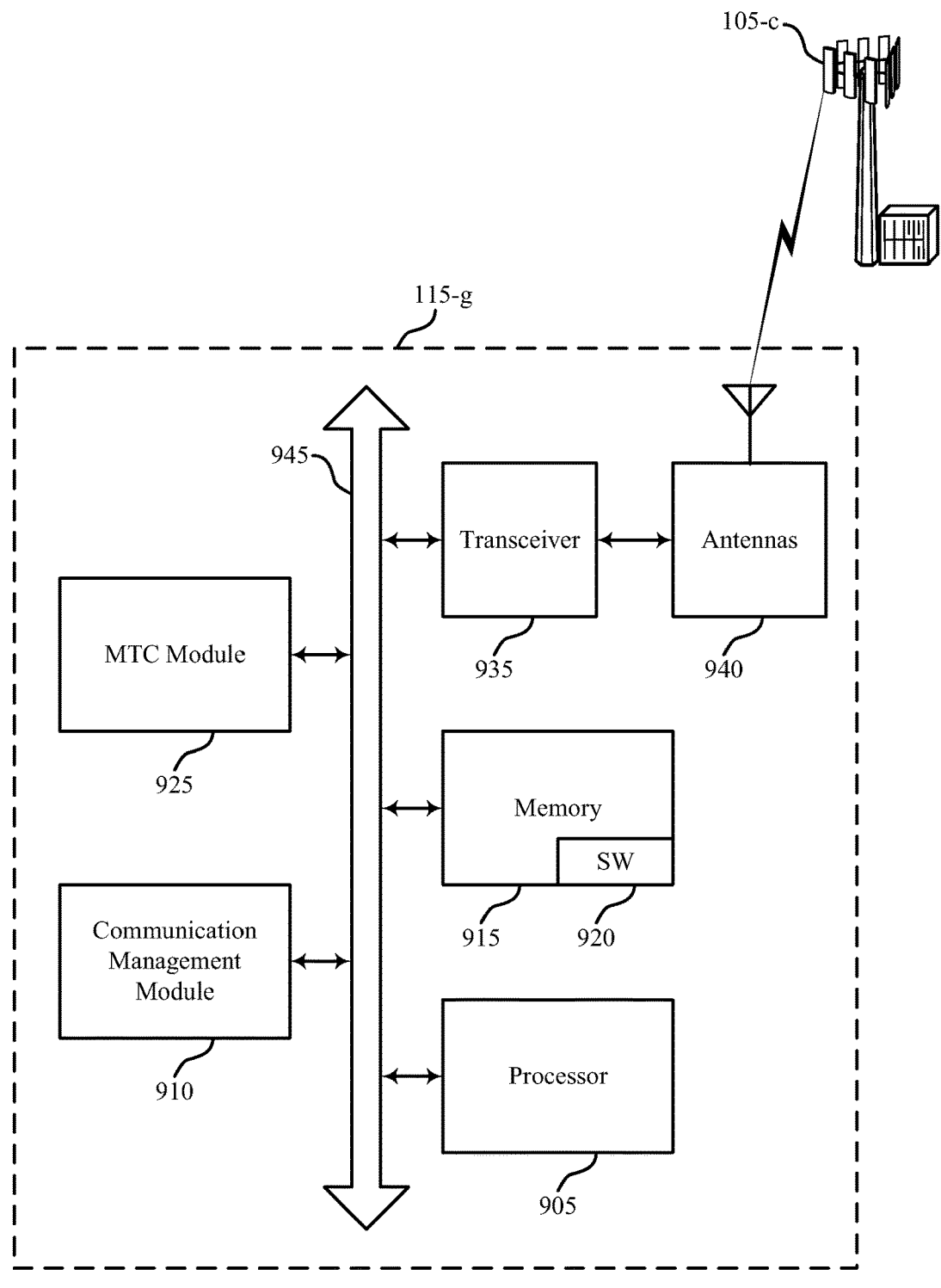
FIG. 9 illustrates a block diagram of a system including a UE configured for regularly scheduled sessions in a cellular IoT system in accordance with various aspects of the present disclosure.

FIG. 9 shows a diagram of a system 900 including a UE 115-g configured for regularly scheduled sessions in a cellular IoT system in accordance with various aspects of the present disclosure. System 900 may include UE 115-g, which may be an example of a UE 115 described above with reference to FIGS. 1-8. UE 115-g may include a communication management module 910, which may be an example of a communication management module 610 described with reference to FIGS. 6-8. UE 115-g may also include an MTC module 925, described below. UE 115-g may also include components for bidirectional voice and data communications including components for transmitting communications and components for receiving communications. For example, UE 115-g may communicate bi-directionally with a UE 115 (not shown) or base station 105-c.

The MTC module 925 may exchange data with a network based on MTC procedures as described above with reference to FIGS. 2-5. For example, the MTC module 925 may facilitate improved communication between the UE 115-g and base station 105-c by using open loop timing synchronization to determine transmit symbol time. In this example, the MTC module 925 may also facilitate the use of an extended cyclic prefix length in uplink transmissions, while non-extended cyclic prefix lengths may be used with downlink transmissions. By using extended uplink cyclic prefixes, uplink signals from different UEs 115 may arrive at a base station 105-c within a window of time (e.g., the maximum round-trip delay between the UE 115 and the base station 105-c) covered by the uplink cyclic prefix.

In other examples of MTC procedures, UE 115-g may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

In other examples of MTC procedures, UE 115-g may synchronize with a cell using a waveform known to the UE beforehand, and common to a group of cells in the local region. The UE 115 may then determine a physical broadcast channel (PBCH) time. UE 115-g may receive the PBCH and use it to determine a physical layer ID for the cell and a frequency for uplink transmissions. The PBCH may also indicate a channel configuration, which may enable UE 115-g to perform a random access procedure. The channel configuration may include a time and frequency resource configuration of a shared traffic channel. In some cases, UE 115-g may determine resources for data transmission based on an index of a control channel transmission. In some cases, there may be a predetermined delay between control channel transmissions and data channel transmissions. UE 115-g may then enter a low power state during the delay.

In other examples of a MTC procedures, the MTC module 925 may be configured to identify time or frequency resources allocated to UE 115-g by base station 105-c. In this example, the resource allocation may be apportioned based on a type and class of PRACH signal scheduled for transmission. For instance, the MTC module 925 may determine that UE 115-g is assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at UE 115-g).

In other examples of a MTC procedures, the MTC module 925 may facilitate using stored control information from a first communication session with the base station to determine the power and timing control information for a subsequent second communication session. Specifically, in this example, the MTC module 925 may establish a first communication session with base station 105-c and receive, during the first communication session, closed loop control information from base station 105-c to aid UE 115-g in adjusting transmit signal symbol timing or power control levels associated with an uplink transmission. In such instance, the MTC module 925 may facilitate storing, in the memory 915, the transmit power and symbol timing information derived from the closed loop control information during the first communication session. Subsequently, the MTC module 925 may utilize the stored closed loop control information from the first communication session to determine the transmit signal power or symbol timing to establish a second communication session with base station 105-c.

UE 115-g may also include a processor module 905, and memory 915 (including software (SW)) 920, a transceiver module 935, and one or more antenna(s) 940, each of which may communicate, directly or indirectly, with each other (e.g., via buses 945). The transceiver module 935 may communicate bi-directionally, via the antenna(s) 940 and/or wired or wireless links, with one or more networks, as described above. For example, the transceiver module 935 may communicate bi-directionally with base station 105-c and/or another UE 115. The transceiver module 935 may include a modem to modulate the packets and provide the modulated packets to the antenna(s) 940 for transmission, and to demodulate packets received from the antenna(s) 940. While UE 115-g may include a single antenna 940, UE 115-g may also have multiple antennas 940 capable of concurrently transmitting and/or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., regularly scheduled sessions in a cellular IoT system, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU) such as an ARM® based processor or those made by Intel® Corporation or AMD®), a microcontroller, an application-specific integrated circuit (ASIC), etc.

Figure 10:
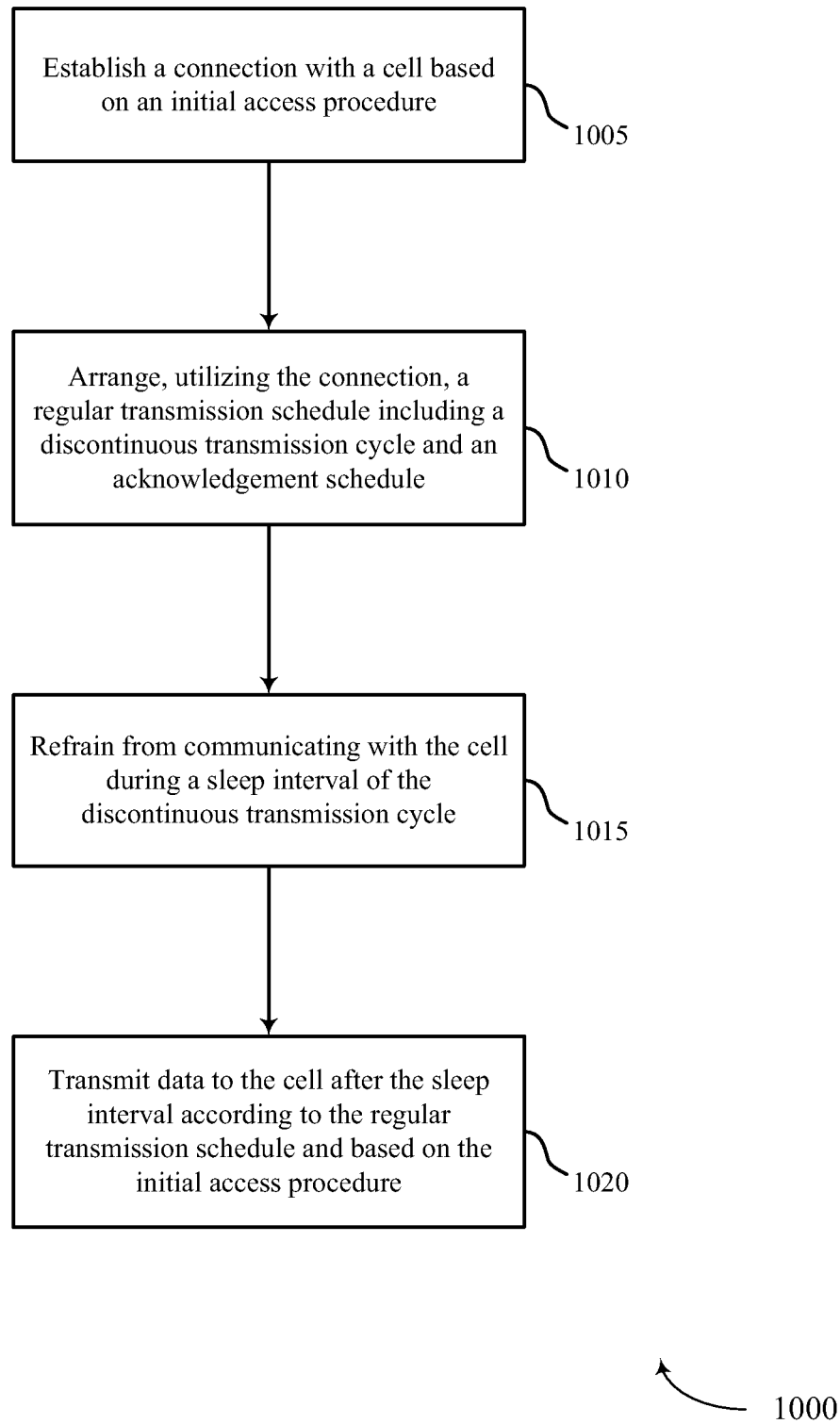
FIG. 10 shows a flowchart illustrating a method for regularly scheduled sessions in a cellular IoT system in accordance with various aspects of the present disclosure.

FIG. 10 shows a flowchart illustrating a method 1000 for regularly scheduled sessions in a cellular IoT system in accordance with various aspects of the present disclosure. The operations of method 1000 may be implemented by a UE 115 or its components as described with reference to FIGS. 1-9. For example, the operations of method 1000 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may establish a connection with a base station based on an initial access procedure as described above with reference to FIGS. 2-5. In certain examples, the operations of block 1005 may be performed by the connection module 705 as described above with reference to FIG. 7.

At block 1010, the UE 115 may arrange, utilizing the connection, a regular transmission schedule comprising a discontinuous transmission cycle and an acknowledgement schedule as described above with reference to FIGS. 2-5. In certain examples, the operations of block 1010 may be performed by the scheduling module 710 as described above with reference to FIG. 7.

At block 1015, the UE 115 may refrain from communicating with the base station 105 during a sleep interval of the discontinuous transmission cycle as described above with reference to FIGS. 2-5. In certain examples, the operations of block 1015 may be performed by the sleep module 715 as described above with reference to FIG. 7.

At block 1020, the UE 115 may transmit data to the base station 105 after the sleep interval according to the regular transmission schedule and based at least in part on the initial access procedure as described above with reference to FIGS. 2-5. In certain examples, the operations of block 1020 may be performed by the transmitter 615 as described above with reference to FIG. 6.

Figure 11:
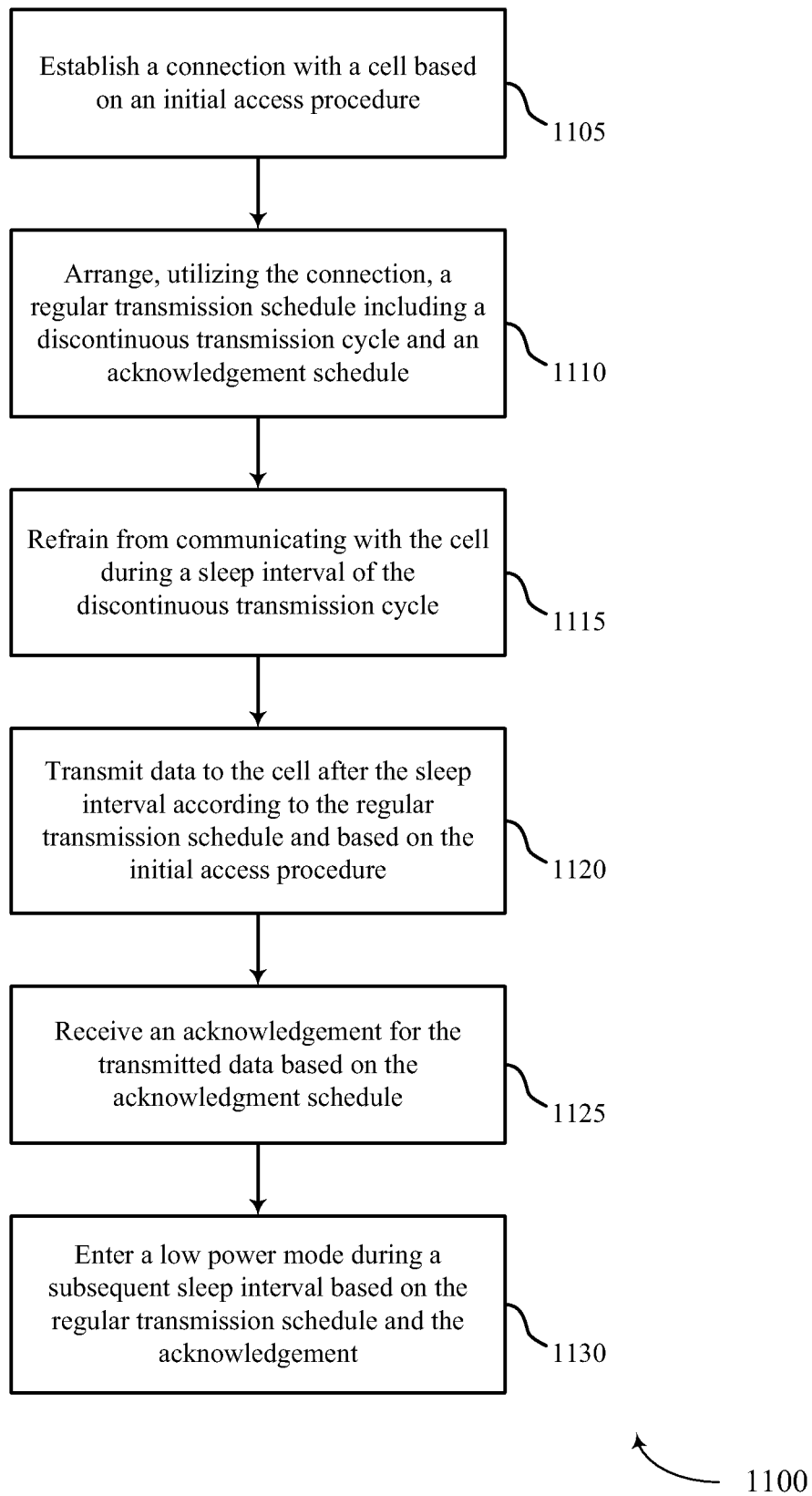
FIG. 11 shows a flowchart illustrating a method for regularly scheduled sessions in a cellular IoT system in accordance with various aspects of the present disclosure.

FIG. 11 shows a flowchart illustrating a method 1100 for regularly scheduled sessions in a cellular IoT system in accordance with various aspects of the present disclosure. The operations of method 1100 may be implemented by a UE 115 or its components as described with reference to FIGS. 1-9. For example, the operations of method 1100 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of method 1000 of FIG. 10.

At block 1105, the UE 115 may establish a connection with a base station 105 based on an initial access procedure as described above with reference to FIGS. 2-5. In certain examples, the operations of block 1105 may be performed by the connection module 705 as described above with reference to FIG. 7.

At block 1110, the UE 115 may arrange, utilizing the connection, a regular transmission schedule comprising a discontinuous transmission cycle and an acknowledgement schedule as described above with reference to FIGS. 2-5. In certain examples, the operations of block 1110 may be performed by the scheduling module 710 as described above with reference to FIG. 7.

At block 1115, the UE 115 may refrain from communicating with the base station 105 during a sleep interval of the discontinuous transmission cycle as described above with reference to FIGS. 2-5. In certain examples, the operations of block 1115 may be performed by the sleep module 715 as described above with reference to FIG. 7.

At block 1120, the UE 115 may transmit data to (or receive data from) the base station 105 after the sleep interval according to the regular transmission schedule and based at least in part on the initial access procedure as described above with reference to FIGS. 2-5. In certain examples, the operations of block 1120 may be performed by the transmitter 615 as described above with reference to FIG. 6.

At block 1125, the UE 115 may receive an acknowledgement for the transmitted data based on the acknowledgment schedule as described above with reference to FIGS. 2-5. In certain examples, the operations of block 1125 may be performed by the ACK module 805 as described above with reference to FIG. 8.

At block 1130, the UE 115 may enter a low power mode during a subsequent sleep interval based on the regular transmission schedule and the acknowledgement as described above with reference to FIGS. 2-5. In certain examples, the operations of block 1130 may be performed by the sleep module 715 as described above with reference to FIG. 7.

Figure 12:
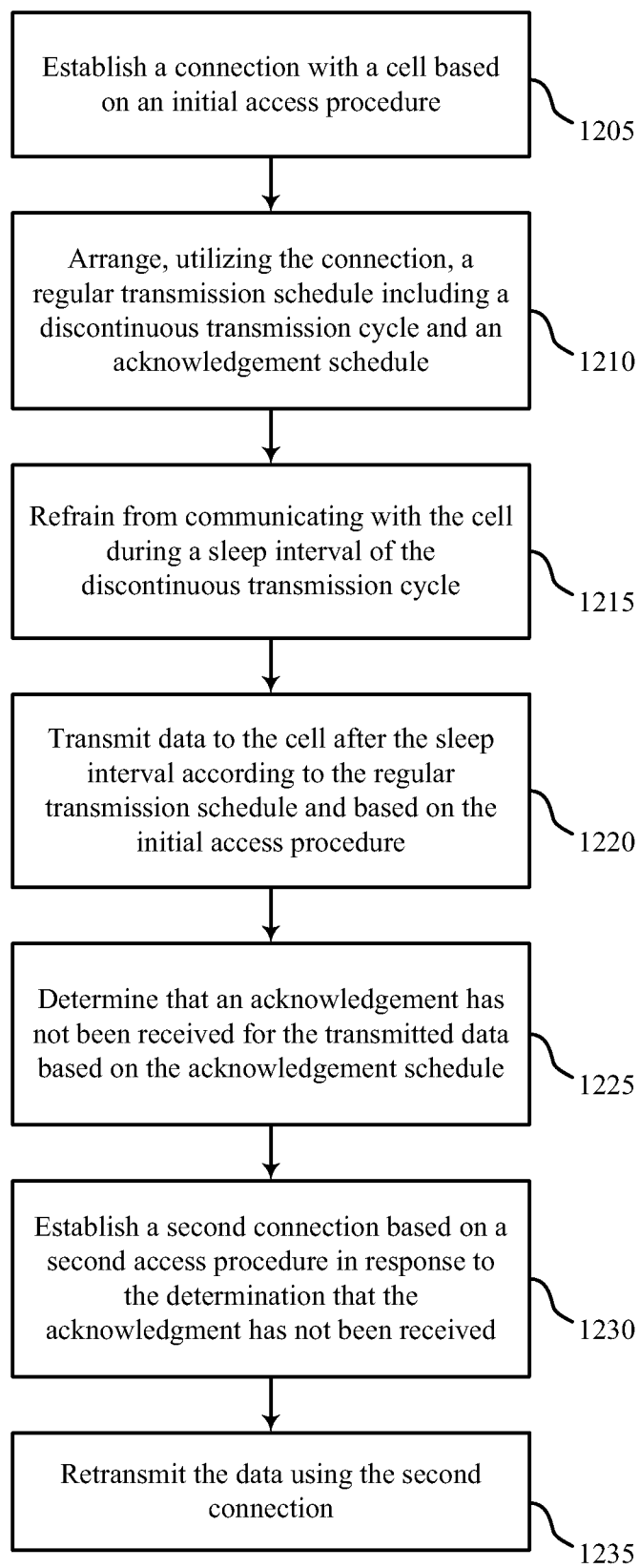
FIG. 12 shows a flowchart illustrating a method for regularly scheduled sessions in a cellular IoT system in accordance with various aspects of the present disclosure.

FIG. 12 shows a flowchart illustrating a method 1200 for regularly scheduled sessions in a cellular IoT system in accordance with various aspects of the present disclosure. The operations of method 1200 may be implemented by a UE 115 or its components as described with reference to FIGS. 1-9. For example, the operations of method 1200 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 1000, and 1100 of FIGS. 10-11.

At block 1205, the UE 115 may establish a connection with a base station 105 based on an initial access procedure as described above with reference to FIGS. 2-5. In certain examples, the operations of block 1205 may be performed by the connection module 705 as described above with reference to FIG. 7.

At block 1210, the UE 115 may arrange, utilizing the connection, a regular transmission schedule comprising a discontinuous transmission cycle and an acknowledgement schedule as described above with reference to FIGS. 2-5. In certain examples, the operations of block 1210 may be performed by the scheduling module 710 as described above with reference to FIG. 7.

At block 1215, the UE 115 may refrain from communicating with the base station 105 during a sleep interval of the discontinuous transmission cycle as described above with reference to FIGS. 2-5. In certain examples, the operations of block 1215 may be performed by the sleep module 715 as described above with reference to FIG. 7.

At block 1220, the UE 115 may transmit data to (or receive data from) the base station 105 after the sleep interval according to the regular transmission schedule and based at least in part on the initial access procedure as described above with reference to FIGS. 2-5. In certain examples, the operations of block 1220 may be performed by the transmitter 615 as described above with reference to FIG. 6.

At block 1225, the UE 115 may determine that an acknowledgement has not been received for the transmitted data based on the acknowledgement schedule as described above with reference to FIGS. 2-5. In certain examples, the operations of block 1225 may be performed by the ACK module 805 as described above with reference to FIG. 8.

At block 1230, the UE 115 may establish a second connection based on a second access procedure in response to the determination that the acknowledgment has not been received as described above with reference to FIGS. 2-5. In certain examples, the operations of block 1230 may be performed by the connection module 705 as described above with reference to FIG. 7.

At block 1235, the UE 115 may retransmit the data using the second connection as described above with reference to FIGS. 2-5. In certain examples, the operations of block 1235 may be performed by the transmitter 615 as described above with reference to FIG. 6.

Figure 13:
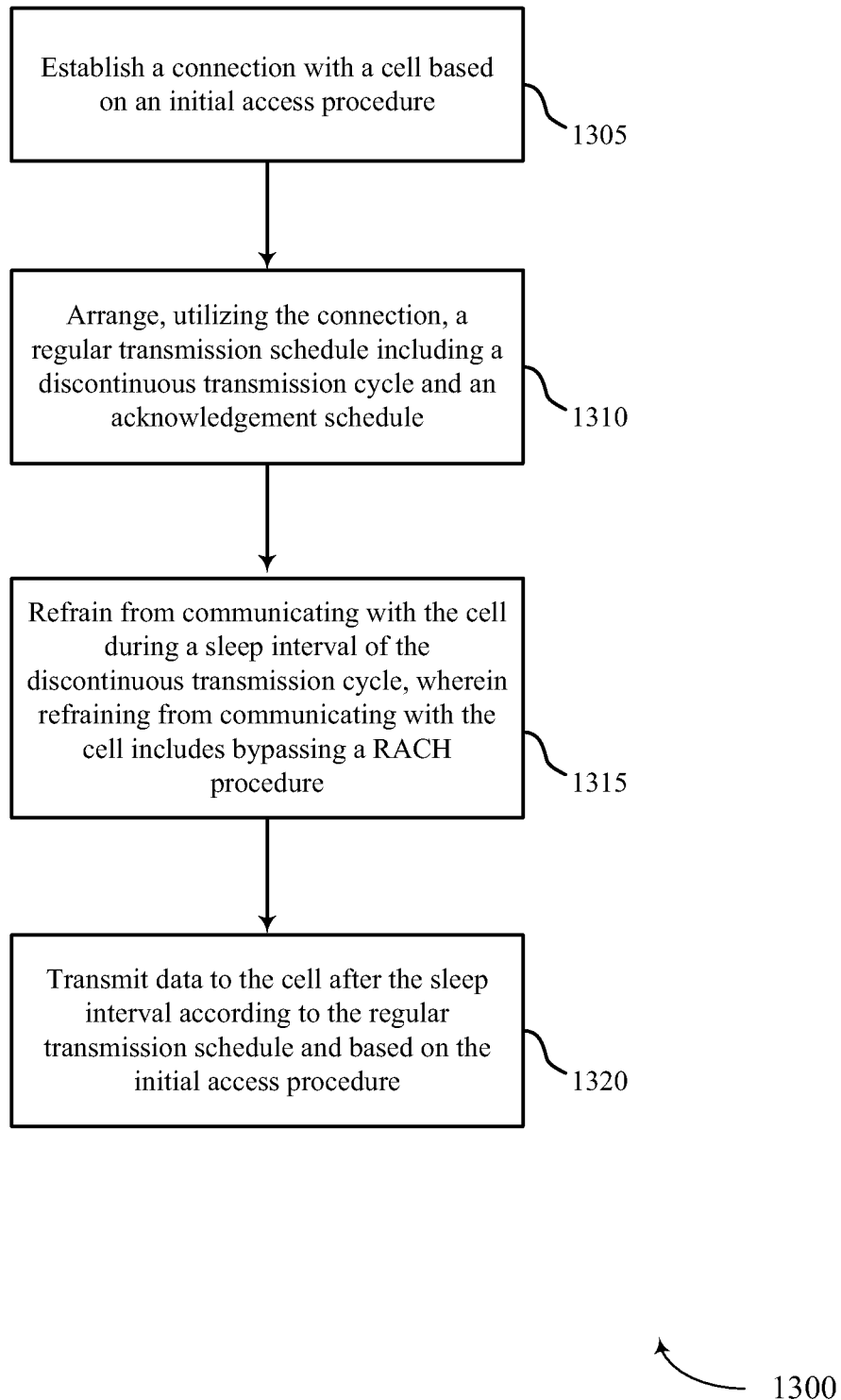
FIG. 13 shows a flowchart illustrating a method for regularly scheduled sessions in a cellular IoT system in accordance with various aspects of the present disclosure.

FIG. 13 shows a flowchart illustrating a method 1300 for regularly scheduled sessions in a cellular IoT system in accordance with various aspects of the present disclosure. The operations of method 1300 may be implemented by a UE 115 or its components as described with reference to FIGS. 1-9. For example, the operations of method 1300 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 1000, 1100, and 1200 of FIGS. 10-12.

At block 1305, the UE 115 may establish a connection with a base station 105 based on an initial access procedure as described above with reference to FIGS. 2-5. In certain examples, the operations of block 1305 may be performed by the connection module 705 as described above with reference to FIG. 7.

At block 1310, the UE 115 may arrange, utilizing the connection, a regular transmission schedule comprising a discontinuous transmission cycle and an acknowledgement schedule as described above with reference to FIGS. 2-5. In certain examples, the operations of block 1310 may be performed by the scheduling module 710 as described above with reference to FIG. 7.

At block 1315, the UE 115 may refrain from communicating with the base station 105 during a sleep interval of the discontinuous transmission cycle as described above with reference to FIGS. 2-5. In some embodiments, refraining from communicating with the base station 105 may comprise bypassing a RACH procedure as described above with reference to FIGS. 2-5. In certain examples, the operations of block 1325 may be performed by the sleep module 715 as described above with reference to FIG. 7. In certain examples, the operations of block 1315 may be performed by the sleep module 715 as described above with reference to FIG. 7.

At block 1320, the UE 115 may transmit data to (or receive data from) the base station 105 after the sleep interval according to the regular transmission schedule and based at least in part on the initial access procedure as described above with reference to FIGS. 2-5. In certain examples, the operations of block 1320 may be performed by the transmitter 615 as described above with reference to FIG. 6.

Figure 14:
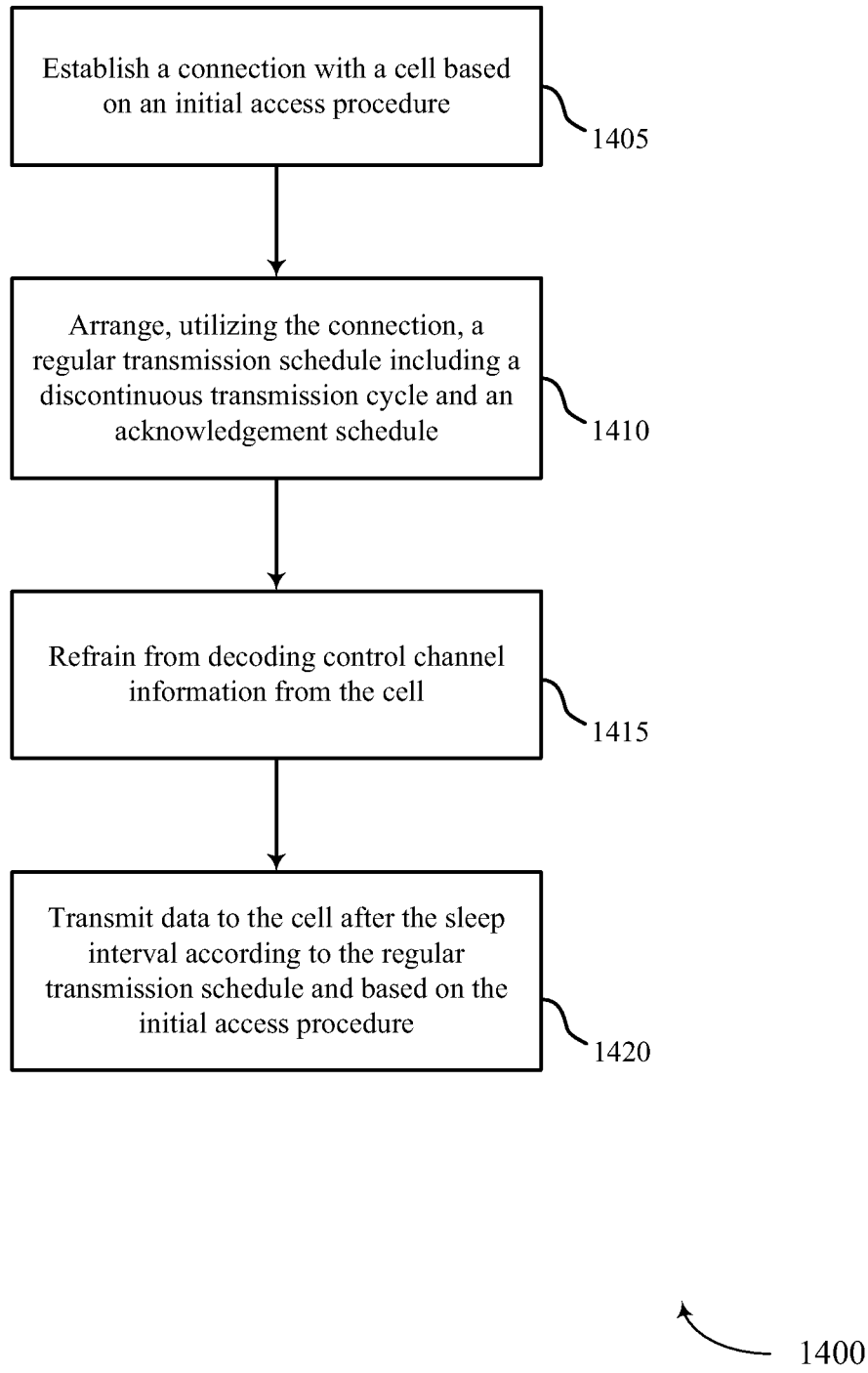
FIG. 14 shows a flowchart illustrating a method for regularly scheduled sessions in a cellular IoT system in accordance with various aspects of the present disclosure.

FIG. 14 shows a flowchart illustrating a method 1400 for regularly scheduled sessions in a cellular IoT system in accordance with various aspects of the present disclosure. The operations of method 1400 may be implemented by a UE 115 or its components as described with reference to FIGS. 1-9. For example, the operations of method 1400 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 1000, 1100, 1200, and 1300 of FIGS. 10-13.

At block 1405, the UE 115 may establish a connection with a base station 105 based on an initial access procedure as described above with reference to FIGS. 2-5. In certain examples, the operations of block 1405 may be performed by the connection module 705 as described above with reference to FIG. 7.

At block 1410, the UE 115 may arrange, utilizing the connection, a regular transmission schedule comprising a discontinuous transmission cycle and an acknowledgement schedule as described above with reference to FIGS. 2-5. In certain examples, the operations of block 1410 may be performed by the scheduling module 710 as described above with reference to FIG. 7.

At block 1415, the UE 115 may refrain from communicating with the base station 105 during a sleep interval of the discontinuous transmission cycle as described above with reference to FIGS. 2-5. In some embodiments, refraining from communicating with the base station 105 may comprise refraining from decoding control channel information from the base station 105 as described above with reference to FIGS. 2-5. In certain examples, the operations of block 1425 may be performed by the sleep module 715 as described above with reference to FIG. 7. In certain examples, the operations of block 1415 may be performed by the sleep module 715 as described above with reference to FIG. 7.

At block 1420, the UE 115 may transmit data to (or receive data from) the base station after the sleep interval according to the regular transmission schedule and based at least in part on the initial access procedure as described above with reference to FIGS. 2-5. In certain examples, the operations of block 1420 may be performed by the transmitter 615 as described above with reference to FIG. 6.

Figure 15:
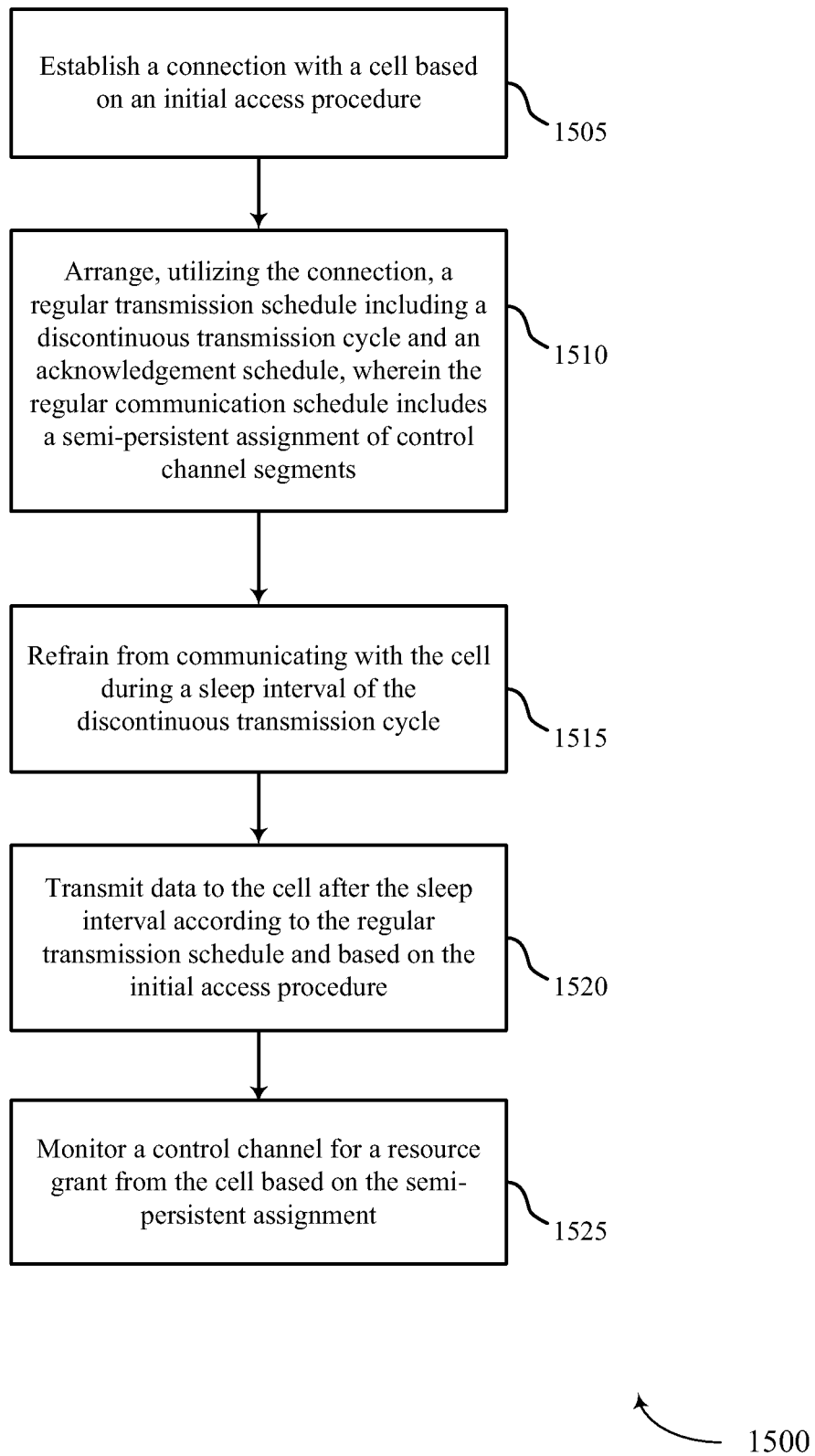
FIG. 15 shows a flowchart illustrating a method for regularly scheduled sessions in a cellular IoT system in accordance with various aspects of the present disclosure.

FIG. 15 shows a flowchart illustrating a method 1500 for regularly scheduled sessions in a cellular IoT system in accordance with various aspects of the present disclosure. The operations of method 1500 may be implemented by a UE 115 or its components as described with reference to FIGS. 1-9. For example, the operations of method 1500 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1000, 1100, 1200, 1300, and 1400 of FIGS. 10-14.

At block 1505, the UE 115 may establish a connection with a base station 105 based on an initial access procedure as described above with reference to FIGS. 2-5. In certain examples, the operations of block 1505 may be performed by the connection module 705 as described above with reference to FIG. 7.

At block 1510, the UE 115 may arrange, utilizing the connection, a regular transmission schedule comprising a discontinuous transmission cycle and an acknowledgement schedule as described above with reference to FIGS. 2-5. In some embodiments, the regular transmission schedule may comprise a semi-persistent assignment of control channel segments as described above with reference to FIGS. 2-5. In certain examples, the operations of block 1525 may be performed by the resource assignment module 810 as described above with reference to FIG. 8. In certain examples, the operations of block 1510 may be performed by the scheduling module 710 as described above with reference to FIG. 7.

At block 1515, the UE 115 may refrain from communicating with the base station 105 during a sleep interval of the discontinuous transmission cycle as described above with reference to FIGS. 2-5. In certain examples, the operations of block 1515 may be performed by the sleep module 715 as described above with reference to FIG. 7.

At block 1520, the UE 115 may transmit data to (or receive data from) the base station after the sleep interval according to the regular transmission schedule and based at least in part on the initial access procedure as described above with reference to FIGS. 2-5. In certain examples, the operations of block 1520 may be performed by the transmitter 615 as described above with reference to FIG. 6.

At block 1530, the UE 115 may monitor a control channel for a resource grant from the base station based on the semi-persistent assignment as described above with reference to FIGS. 2-5. In certain examples, the operations of block 1530 may be performed by the resource assignment module 810 as described above with reference to FIG. 8.

Thus, methods 1000, 1100, 1200, 1300, 1400, and 1500 may provide for regularly scheduled sessions in a cellular IoT system. It should be noted that methods 1000, 1100, 1200, 1300, 1400, and 1500 describe possible embodiments, and that the operations and the steps may be rearranged or otherwise modified such that other embodiments are possible. In some examples, aspects from two or more of the methods 1000, 1100, 1200, 1300, 1400, and 1500 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
    establishing a connection with a cell based at least in part on an initial access procedure;
    scheduling, by the UE and utilizing the connection, a regular transmission schedule for the UE to transmit data, wherein the regular transmission schedule comprises regularly scheduled discontinuous transmission cycles and an acknowledgement schedule, and wherein the acknowledgement schedule comprises time resources for the UE to monitor for a feedback indication for transmitted data;
    refraining from communicating with the cell during a sleep interval of the discontinuous transmission cycles;
    transmitting data to the cell on time-frequency resources after the sleep interval according to the regular transmission schedule, wherein the time-frequency resources are arranged during the initial access procedure for establishing the connection with the cell; and
    bypassing a random access channel (RACH) procedure for each regularly scheduled data exchange, wherein the regularly scheduled data exchange comprises at least the data transmission to the cell on the time-frequency resources after the sleep interval according to the regular transmission schedule arranged by the UE.

2. The method of claim 1, further comprising:
    receiving an acknowledgement for the transmitted data based at least in part on the acknowledgment schedule; and
    entering a low power mode during a subsequent sleep interval based at least in part on the regular transmission schedule and the acknowledgement.

3. The method of claim 2, further comprising:
    entering a high power mode prior to exchanging data with the cell based at least in part on the regular transmission schedule.

4. The method of claim 1, further comprising:
    determining that the feedback indication has not been received for the transmitted data at an indicated time based at least in part on the arranged acknowledgement schedule;
    establishing a second connection based at least in part on a second access procedure in response to the determination that the feedback indication has not been received; and
    retransmitting the data using the second connection.

5. The method of claim 1, wherein refraining from communicating with the cell comprises:
    refraining from decoding control channel information from the cell.

6. The method of claim 1, wherein the regular transmission schedule comprises a semi-persistent assignment of control channel segments.

7. The method of claim 6, further comprising:
monitoring a control channel for a resource grant from the cell based at least in part on the semi-persistent assignment.

8. The method of claim 6, wherein the semi-persistent assignment of channel segments is based at least in part on an identification (ID) of the UE and a frame index.

9. The method of claim 1, wherein the regular transmission schedule is associated with the UE based at least in part on an ID of the UE and a frame index.

10. The method of claim 9, wherein the ID is assigned to the UE for a limited time and reusable by another UE after the limited time has expired.

11. The method of claim 1, wherein the sleep interval is longer than an inactivity timer of the cell.

12. The method of claim 1, further comprising:
exchanging data with a network based at least in part on machine type communication (MTC) procedures.

13. An apparatus for wireless communication at a user equipment (UE), comprising:
means for establishing a connection with a cell based at least in part on an initial access procedure;
means for scheduling, by the UE and utilizing the connection, a regular transmission schedule for the UE to transmit data, wherein the regular transmission schedule comprises regularly scheduled discontinuous transmission cycles and an acknowledgement schedule, and wherein the acknowledgement schedule comprises time resources for the UE to monitor for a feedback indication for transmitted data;
means for refraining from communicating with the cell during a sleep interval of the discontinuous transmission cycles;
means for transmitting data to the cell on time-frequency resources after the sleep interval according to the regular transmission schedule, wherein the time-frequency resources are arranged during the initial access procedure for establishing the connection with the cell; and
means for bypassing a random access channel (RACH) procedure for each regularly scheduled data exchange, wherein the regularly scheduled data exchange comprises at least the data transmission to the cell on the time-frequency resources after the sleep interval according to the regular transmission schedule arranged by the UE.

14. The apparatus of claim 13, further comprising:
means for receiving an acknowledgement for the transmitted data based at least in part on the acknowledgment schedule; and
means for entering a low power mode during a subsequent sleep interval based at least in part on the regular transmission schedule and the acknowledgement.

15. The apparatus of claim 14, further comprising:
means for entering a high power mode prior to exchanging data with the cell based at least in part on the regular transmission schedule.

16. The apparatus of claim 13, further comprising:
means for determining that the feedback indication has not been received for the transmitted data at an indicated time based at least in part on the arranged acknowledgement schedule;
means for establishing a second connection based at least in part on a second access procedure in response to the determination that the feedback indication has not been received; and
means for retransmitting the data using the second connection.

17. The apparatus of claim 13, wherein refraining from communicating with the cell comprises:
refraining from decoding control channel information from the cell.

18. The apparatus of claim 13, wherein the regular transmission schedule comprises a semi-persistent assignment of control channel segments.

19. The apparatus of claim 18, further comprising:
means for monitoring a control channel for a resource grant from the cell based at least in part on the semi-persistent assignment.

20. The apparatus of claim 18, wherein the semi-persistent assignment of channel segments is based at least in part on an identification (ID) of the UE and a frame index.

21. The apparatus of claim 13, wherein the regular transmission schedule is associated with the UE based at least in part on an ID of the UE and a frame index.

22. The apparatus of claim 21, wherein the ID is assigned to the UE for a limited time and reusable by another UE after the limited time has expired.

23. The apparatus of claim 13, wherein the sleep interval is longer than an inactivity timer of the cell.

24. The apparatus of claim 13, further comprising:
means for exchanging data with a network based at least in part on machine type communication (MTC) procedures.

25. An apparatus for wireless communication at a user equipment (UE), comprising:
a processor;
memory coupled with the processor; and
instructions stored in the memory; wherein the instructions are executable by the processor to:
establish a connection with a cell based at least in part on an initial access procedure;
schedule, by the UE and utilizing the connection, a regular transmission schedule for the UE to transmit data, wherein the regular transmission schedule comprises regularly scheduled discontinuous transmission cycles and an acknowledgement schedule, and wherein the acknowledgement schedule comprises time resources for the UE to monitor for a feedback indication for transmitted data;
refrain from communicating with the cell during a sleep interval of the discontinuous transmission cycles;
transmit data to the cell on time-frequency resources after the sleep interval according to the regular transmission schedule, wherein the time-frequency resources are arranged during the initial access procedure for establishing the connection with the cell; and
bypass a random access channel (RACH) procedure for each regularly scheduled data exchange, wherein the regularly scheduled data exchange comprises at least the data transmission to the cell on the time-frequency resources after the sleep interval according to the regular transmission schedule arranged by the UE.

26. The apparatus of claim 25, wherein the instructions are executable by the processor to:
receive an acknowledgement for the transmitted data based at least in part on the acknowledgment schedule; and
enter a low power mode during a subsequent sleep interval based at least in part on the regular transmission schedule and the acknowledgement.

27. The apparatus of claim 25, wherein the instructions are executable by the processor to:

determine that the feedback indication has not been received for the transmitted data at an indicated time based at least in part on the arranged acknowledgement schedule;

establish a second connection based at least in part on a second access procedure in response to the determination that the feedback indication has not been received; and retransmit the data using the second connection.

28. A non-transitory computer-readable medium storing code for wireless communication at a user equipment (UE), the code comprising instructions executable to:

establish a connection with a cell based at least in part on an initial access procedure;

schedule, by the UE and utilizing the connection, a regular transmission schedule for the UE to transmit data, wherein the regular transmission schedule comprises regularly scheduled discontinuous transmission cycles and an acknowledgement schedule, and wherein the acknowledgement schedule comprises time resources for the UE to monitor for a feedback indication for transmitted data;

refrain from communicating with the cell during a sleep interval of the discontinuous transmission cycles;

transmit data to the cell on time-frequency resources after the sleep interval according to the regular transmission schedule, wherein the time-frequency resources are arranged during the initial access procedure for establishing the connection with the cell; and bypass a random access channel (RACH) procedure for each regularly scheduled data exchange, wherein the regularly scheduled data exchange comprises at least the data transmission to the cell on the time-frequency resources after the sleep interval according to the regular transmission schedule arranged by the UE.

* * * * *